Aug. 8, 1967     N. A. FORBES     3,335,382
TEMPERATURE PROBE

Original Filed Nov. 19, 1964     3 Sheets-Sheet 3

United States Patent Office 3,335,382
Patented Aug. 8, 1967

3,335,382
TEMPERATURE PROBE
Norman A. Forbes, Louisville, Ky., assignor to American Radiator & Standard Corporation, New York, N.Y., a corporation of Delaware
Original application Nov. 19, 1964, Ser. No. 412,482, now Patent No. 3,277,946, dated Oct. 11, 1966. Divided and this application June 20, 1966, Ser. No. 568,090
1 Claim. (Cl. 338—22)

ABSTRACT OF THE DISCLOSURE

A thermistor probe is positioned within the boiler to monitor the fluid temperature of a high heat flux boiler system. The system also includes a flame sensor to sense for the burning of fuel. Signals from the thermistor probe, the flame sensor and an external thermostat interact to regulate a fuel valve and a blower for controlling the feeding of fuel to a burner which heats the boiler fluid.

This is a division of application Ser. No. 412,482 filed Nov. 19, 1964.

This invention relates to heater control systems and more particularly to fast operating safety control systems employing temperature limit controls and flame controls.

In presently available oil burning and gas burning heaters, safety controls are included to limit the temperature of the boiler and to prevent the prolonged release of unburned fuel because of faulty ignition. Therefore, presently available heaters usually include temperature limit controls employing liquid filled bulbs or bimetallic elements which sense temperature and when the temperature exceeds a given value turn off the fuel supply. Such temperature sensors have a time constant in the order of ninety seconds. In addition, such presently available systems include combustion controls to release unburned fuel for a "trial-for-ignition" time at the start of each combustion cycle. If combustion is not obtained within a given time, the fuel feed is turned off and the controls must generally be manually reset. Thus, the combustion controls prevent the sudden ignition of large quantities of fuel which may result in a damaging explosion.

Lately, there has become available a high heat flux boiler which has a low water content, a low combustion area, and a low mass, all relative to the rate at which fuel is burned. Accordingly, if heat removal from the boiler stops because of some malfunctioning, the temperature rises at a rate much faster than with boilers in heretofore available heating systems. For example, the rate of rise of temperature within a high heat flux boiler can be of the order of five degrees Fahrenheit per second. Thus, if the temperature limit control is to lag the boiler water temperature by no more than ten degrees, the control must have a thermal time constant of about two seconds. Therefore, it is apparent that conventional temperature limit controls with time constants forty to fifty times longer cannot be employed with high heat flux boilers.

Furthermore, since high heat flux boilers use a forced draft rather than an induced draft, they can store more unburned fuel than conventional boilers if the blower fails. Accordingly, the "trial-for-ignition" time must be kept as short as possible to minimize the accumulation of unburnt fuel which may be detonated. However, the "trial-for-ignition" time must be long enough for a flame control to recognize a flame. Therefore, if the "trial-for-ignition" time must be short for safety reasons, the flame control must be fast acting.

It is, accordingly, a general object of the invention to provide an improved system for controlling the flow of fuel to a burner and for igniting the fuel fed to the burner of a heating system.

It is another object of the invention to provide an improved temperature limit control for preventing the burning of fuel by a heating system when the temperature of the heat generating portion of the system exceeds a given value.

It is a further object of the invention to provide an improved temperature limit control which operates many times faster than conventional temperature limit controls.

It is yet another object of the invention to provide flame sensing apparatus.

It is yet a further object of the invention to provide improved flame sensing apparatus which responds to the presence of flame in a relatively short time.

It is a still further object of the invention to satisfy the above objects with control apparatus that is "fail-safe."

Briefly, the invention contemplates control apparatus for a heating system which includes a fuel burner, a boiler containing fluid as a heat exchange medium, fuel feeding means and fuel igniting means. The control apparatus comprises a temperature limit sensor including a thermistor in intimate thermal contact with the boiler fluid to prevent operation of the fuel feeding and igniting means when the fluid temperature exceeds a given value, and a flame sensor means to terminate operation of the fuel feeding means if a flame is not sensed within a given time after start of operation of the fuel feeding and fuel igniting means, or if a flame fails during normal operation.

Some features of the invention are concerned with insuring that if the elements of the control means responsive to the temperature sensor or the flame sensor as well as the temperature sensor and flame sensor themselves fail, the system shuts down with the fuel feeding means and the fuel igniting means deenergized.

Another feature of the invention concerns a fast operating temperature probe for sensing the temperature of the fluid in the boiler of a heating system.

Other objects, features and advantages of the invention will be apparent from the following detailed description when read with the accompanying drawing which shows, by way of example and not limitation, the now preferred embodiment of the invention.

Figure 1:
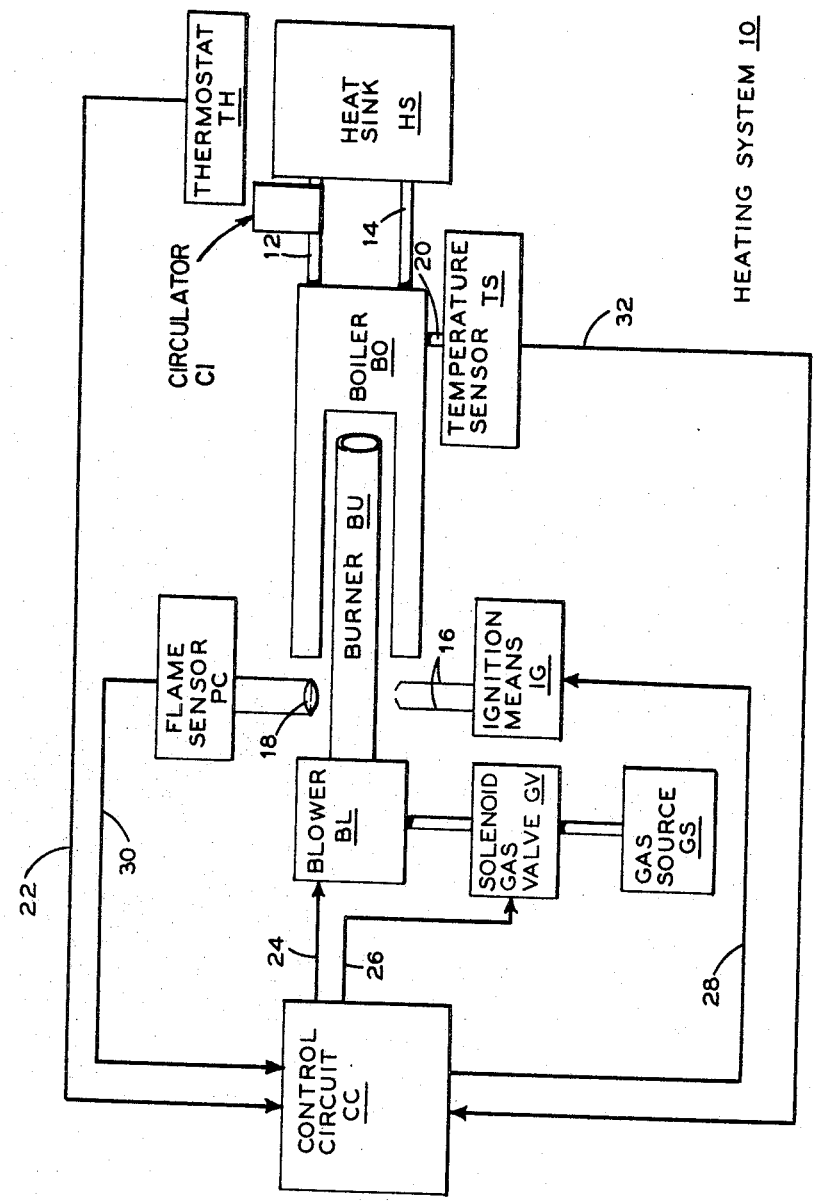
FIG. 1 is a block diagram of a heating system incorporating control apparatus according to the invention.

Referring now to FIG. 1, a heating system 10 is shown comprising a burner BU surrounded by a boiler BO containing a fluid such as water connected via conduits 12 and 14 and circulator CI to a heat sink HS which may be radiators or the like for heating the rooms of a building. Burner BU may be a high heat flux burner as described in the copending application Ser. No. 397,804 filed Sept. 21, 1964, by Wilson J. Witten, Jr. and assigned to the same assignee. Boiler BO may be of the type described in the copending application Ser. No. 397,747 filed Sept. 21, 1964, by Wilson J. Witten, Jr. and assigned to the same assignee.

In any event, fuel such as a gaseous hydrocarbon from a gas source GS is controllably fed via a solenoid operated gas valve GV to a blower BL where it is mixed with air and force fed to burner BU. An ignition means IG which may employ a spark plug 16 and an ignition coil is positioned near burner BU to ignite the gaseous mixture diffusing therefrom. A flame sensor PC which preferably includes a photoconductive element and, if necessary, a lens 18 is positioned near burner BU for sensing the burning of fuel. Fitted into boiler BO, in intimate contact with the fluid therein, is a temperature probe 20 which is included in temperature sensor means TS. A control circuit CC energized by thermostat TH, positioned in a region to be heated, controls the operation of blower BL, ignition means IG and gas valve GV in accordance with information received from temperature sensor TS and flame sensor PC.

Generally, when the temperature of heat sink HS falls below a particular value, thermostat TH signals control circuit CC of this fact via cable 22. Assuming normal (fault-free) operation, control circuit CC energizes blower BL via cable 24 and, a short time thereafter, gas valve GV via cable 26 and ignition means IG via cable 28.

It should be noted that gas valve GV and ignition IG are energized a given period of time after the energizing of blower BL for permitting the pre-purging of the firing portion of the system to protect against a slowly leaking gas valve.

If there is a leak in the gas valve, a combustible mixture of gas and air may accumulate. Therefore, a blower BL will blow this potentially dangerous mixture out the flue before ignition is attempted. If a standing pilot is employed instead of an intermittent ignition means any slowly leaking gas is burned and does not accumulate and a pre-purge is not necessary.

In any event, when ignition means IG ignites the fuel, flame sensor PC detects this fact and signals control circuit CC via cable 30. Control circuit CC discontinues energizing ignition means IG and the flame of burner BU sustains the burning of fuel. However, if flame sensor PC does not indicate the sensing of a flame within a given period of time, control circuit CC stops energizing gas valve GV and ignition means IG, and may give an indication of this fact. During operation of the system, whenever the temperature of the fluid in boiler BO exceeds a given value, this fact is transmitted via cable 32 to control circuit CC which deenergizes blower BL, gas valve GV and ignition means IG and prevents their reenergization until the fluid temperature drops below the given value.

The control apparatus shown in FIG. 2 will now be described in detail. It should be noted that throughout the description relays and their associated coils and contacts will be mentioned. Generally, the relay will be specified by its winding reference character, for example, the relay 1R has a winding 1R. In addition, the contact sets of the relays are designated by a reference character comprising the reference character of the relay followed by a number. For example, relay 1R has a contact set 1R1 and a contact set 1R2. All the relays are shown in their unenergized state.

A source of 120 volt, 60 cycle alternating current feeds busses 40 and 42. Disposed across busses 40 and 42 is a circulator CI for pumping boiler fluid around the heat exchange circuit comprising the boiler BO and the heat sink HS.

Bus 40 is connected to bus 43 by means of contact set 3K1 of relay 3K, which is part of the temperature limit control TLC, to be described later.

Gas valve GV, blower BL and ignition means IG are energized from busses 43 and 42 under control of the contact set 1R1 of relay 1R (a first control means). When contact set 1R1 closes, alternating current is applied to blower via leads 24A and 24B of cable 24 and to the winding of time delay relay 2K to start the pre-purge phase of a combustion cycle. Blower BL blows any accumulated gases out the flue. After a given period of time, relay 2K energizes closing contact sets 2K1 and 2K2. The latter closes a circuit between the alternating current busses 43 and 42 via leads 26A and 26B of cable 26 and the solenoid of gas valve GV. Gas valve GV opens causing gas to enter blower BL. Contact set 2K1 closes a circuit between busses 43 and 42 via leads 28A and 28B and ignition means IG which generates a spark as long as energized. The "test-for-ignition" phase of a combustion cycle begins. During normal operation, i.e., no malfunctioning, after a short period of time contact set T1 of a relay T opens interrupting the alternating current to ignition means IG. The spark terminates but fuel continues to burn because gas valve GV and blower BL are still energized and will remain so until contact set 1R1 opens. It should therefore be apparent that by controlling the operation of relay 1R it is possible to control the operation of the fuel feed and the fuel igniting.

The control for primary control PC will now be described. Transformer 2TR has its primary winding 2TRP connected to busses 43 and 42 and its secondary winding 2TRS connected to busses 44 and 50. The winding of relay 1R is in the series circuit comprising bus 44, contact set SS1, bus 46, thermostat TH, contact set 1K1, relay network 48 and bus 50. The winding of relay 2R is in the series circuit comprising bus 44, contact set SS1, bus 46, diodes D6, D7, D8 and D9, bus 58, flame control FC, bus 60, and bus 50.

During normal operation, contact set 1K1 of relay 1K is closed because, as will hereinafter become apparent, relay 1K which is part of the temperature limit control TLC will be energized as long as the fluid in boiler BO is below a given temperature. Accordingly, when thermostat TH which may include a bimetallic switch closes to demand more heat, relay 1R is energized. Note a current path is established through relay network 48 as follows: the winding of relay SS, contact set T2, lead 52 and contact set 2R2. Therefore, it is seen that relay 1K can control the energization of relay 1R which in turn energizes blower BL, gas valve GV and ignition means IG.

Figure 4:
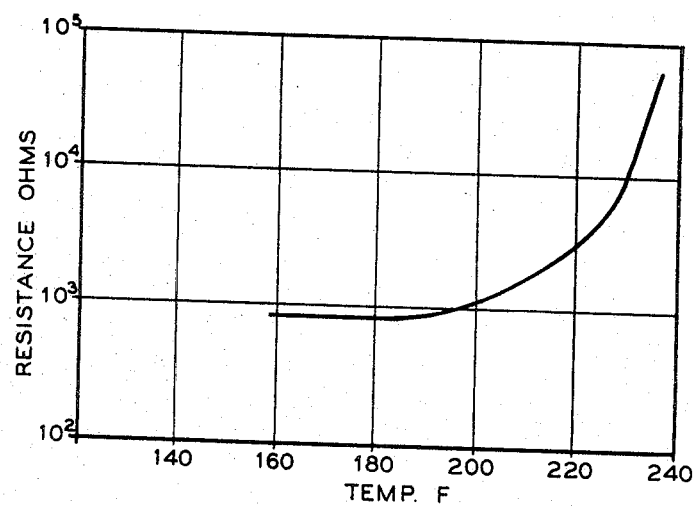
FIG. 4 is a graph of the resistance in ohms as a function of temperature in degrees Fahrenheit of the thermistor of FIG. 3.

Relay 1K is part of temperature limit control TLC (a temperature sensitive control means). Also included in temperature limit control TLC is a source of alternating current which includes: transformer 1TR whose primary winding 1TRP is connected to busses 40 and 42; a source of direct current comprising semi-conductor diode D1 and capacitor C1; a fusible element F1 (circuit breaker) connecting one arm of secondary winding 1TRS to the anode of diode D1; a thermistor TS which is connected between one end of the winding of relay 1K and ground; a lead 54 connecting the junction (output terminal of source of direct current) of diode D1 and capacitor C1; a lead 56 connecting the junction (output terminal of source of direct current) of an end of secondary winding 1TRS and capacitor C1; four diodes D10, D11, D12 and D13; and relay 3K, connected across transformer secondary 1TRS by contact set 1K1 (the purpose of diodes D10, D11, D12 and D13 is to form a contact suppressor to protect contact set 1K1 from the effects of interrupting current to coil of relay 3K, which is inductive). As will hereinafter become apparent, thermistor TS is in intimate thermal contact with boiler fluid. Thermistor TS is a temperature sensitive solid state device whose resistance varies with temperature (see FIG. 4). In particular, thermistor TS is designed with a positive temperature coefficient so that its resistance increases markedly as its temperature exceeds 180 degrees Fahrenheit and preferably at least at the rate of five percent per degree Fahrenheit in the range between 190 and 230 degrees Fahrenheit. The temperature range specified is for when water is the boiler fluid. Relay 1K is a relay having reed contacts whose elastic forces bias the contact set 1K1 to the open position. Therefore, relay 1K when not energized automatically assumes the open state.

Normally, if the temperature of the boiler fluid is below about 220 degrees Fahrenheit the resistance of thermistor TS is such that sufficient current flows through the winding of relay 1K so that contact set 1K1 closes. However, at higher boiler fluid temperatures,, the resistance of thermistor TS is high enough to limit the current through the winding of relay 1K to a value insufficient to hold contact set 1K1 closed. Therefore, relay 3K is deenergized, and contact set 3K1 opens, deenergizing transformer 2TR and the entire primary control PC, the solenoid gas valve GV, the blower BL, and the ignition means IG. Therefore, temperature limit control TLC in response to the temperature of boiler fluid, and through the agency of a temperature sensitive resistance, controls the energization of relay 1R by means of contact set 3K1 which is required to complete the electrical circuit between the primary winding 2TRP and bus 40. Interrupting the flow of gas when the boiler water tends to overheat creates a condition in which the thermostat is calling for heat and there is no flame. To prevent the safety switch SS from interpreting these conditions as an ignition failure and operating, the temperature limit circuit TLC switches off the entire primary control PC, so that safety switch SS is not energized and therefore cannot operate.

Assume temperature limit control TLC is working normally. Then when thermostat TH demands more heat, relay 1R is energized initiating the pre-purge phase of the combustion cycle which is followed by the test-for ignition phase as previously described. By virtue of the relay network 48 the continued energization of relay 1R becomes dependent on the mode of operation of relay 2R and relay SS. Relay SS is a time delay control means in the form of a time delay relay having a normally closed contact set SS1. If the winding of relay SS continuously receives current for greater than a given period of time (actually the normal time for the fuel in burner BU to ignite) contact set SS1 opens, interrupting the circuit from transformer secondary 2TRS to bus 46. Therefore, current stops flowing through the winding of relay 1R and contact set 1R1 opens shutting down the system. Relay SS is advantageously provided with a manual reset to reclose the contact set SS1 so that human intervention is required in such a case. It should be noted that contact set 2R1 shunts the winding of relay SS so that when relay 2R is energized the current initially flowing through relay winding SS is diverted therearound. Accordingly, if relay 2R is energized before the end of the period of time required to energize relay SS, the latter is not energized.

Relay 2R is part of an electrical resistance sensitive control means which includes a bridge rectifier comprising semi-conductor diodes D6, D7, D8 and D9. The junction of the anodes of diodes D6 and D8 are connected to one end of the winding of relay 2R whose other end is connected to the junction of the cathodes of diodes D7 and D9. The junction of the anode of diode D7 and the cathode of diode D6 is connected to bus 46. The junction of the cathode of diode D8 and the anode of diode D9 is connected via flame control FC (an electronic relay) to bus 50. The resistance of flame control FC has a value sufficiently high to prevent energization of relay 2R if flame sensor PC does not sense a flame on burner BU. When flame sensor PC senses a flame the resistance of the flame control FC decreases to such a value that relay 2R is energized.

Flame control FC includes a bridge rectifier comprising semi-conductor diodes D2, D3, D4 and D5 which receive alternating current via leads 58 and 60. Lead 58 connects the junction of diodes D8 and D9 to the junction of the anode of diode D3 and the cathode of diode D2. Lead 60 connects the junction of the cathode of diode D4 and the anode of diode D5 to bus 50. Silicon controlled rectifier SCR has its cathode connected to the junction of the anodes of diodes D2 and D4 and its anode connected to the junction of the cathodes of diodes D3 and D5. A resistor R1 is connected between the control input and the anode of silicon controlled rectifier SCR. Flame sensor PC, a photoconductive element made of cadmium sulfide, for example, is connected between the control input and the anode of silicon controlled rectifier SCR. Silicon controlled rectifier SCR is a solid-state switch which closes when a given current flows into its control input when a positive voltage is present between its anode and cathode, and opens whenever the current into its control input is removed and the anode-cathode voltage falls to zero. It can be considered to be a solid-state thyratron. Resistor R1 and flame sensor PC control the amount of current fed into the control input. When flame sensor PC does not detect a flame its resistance is high and when it detects a flame its resistance is low. When the resistance of the flame sensor PC is high the effective resistance of flame control FC is high and when the resistance of the flame sensor PC is low the effective resistance of flame control FC is low. Therefore, the presence or absence of flame is reflected by the value of the resistance of the flame sensor PC which determines the effective resistance of flame control FC for controlling the energizaiton of relay 2R.

When burner flame is sensed, relay 2R is energized and the alternating current path through relay network 48 is via contact set TR1, lead 52, contact set 1R2 and the winding of relay T. Relay T is a time delay relay which energizes after its winding has continuously received current for at least a given period of time. When relay T energizes: its contact set T1 opens deenergizing ignition means IG and the burner flame becomes self sustaining; and its contact set T2 opens to positively prevent the receipt of current by the winding of relay SS. Fuel will now burn until thermostat TH opens indicating the end of the demand for heat or, relay 3K deenergizes indicating boiler fluid is overheating.

Figure 3:
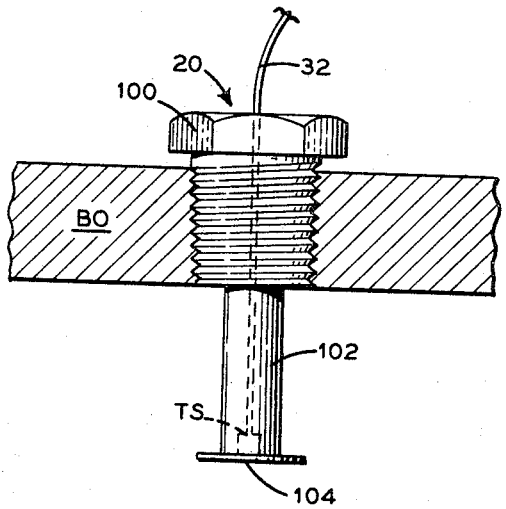
FIG. 3 is a side view partially in section of a temperature probe having a thermistor in accordance with a feature of the invention.

The temperature probe 20 will now be described. In FIG. 3 the temperature probe 20 is shown as screw fitted into an opening in the boiler BO through the agency of threaded fitting 100. Extending from the bottom of fitting 100 is a hollow tube 102. A circular disc 104 is fixed to the base of tube 102. Disc 104 is made of a good thermal conductor such as copper or one of its alloys. Alternatively, disc 104 can be made of a material, for example, molybdenum, that combines relatively high thermal conductivity with a coefficient of thermal expansion that matches that of the thermistor. Thermally conductively fixed to the face of disc 104 inside tube 102 is thermistor TS. Thermistor TS is fixed to disc 104 by means of a thin layer of solder so that there is good thermal and electrical conduction therebetween. Connected to thermistor TS are the signal leads of cable 32 which are brought out through a central opening in threaded fitting 100 for connection to the control circuitry.

In order that thermistor TS rapidly follows the temperature of the boiler fluid the outer face of disc 104 is in intimate contact with the boiler fluid; disc 104 is made of a good thermal conductor; and the medium for fixing thermistor TS to the inner face of disc 104 is also a good thermal conductor. Furthermore, the hollow tube 102 has a minimum wall thickness which is determined merely by mechanical support considerations and rigidity. Thus, the amount of heat that tube 102 can conduct away from disc 104 to the boiler wall is minimized. In addition, the disc 104 is preferably made of material whose thermal coefficient of expansion closely matches that of the material of the thermistor TS. In the usual case, a major limitation on the operating temperature range is the shear stress developed because of the thermal mismatch and this stress is larger as the thermistor diameter increases. Therefore, as the mismatch in thermal expansion coefficient is reduced, thermistor TS can be made appreciably larger in diameter and, accordingly have a quicker thermal response. It should be noted that, in principle, one might expect the time constant to be kept the same by making the thermistor and solder very thin. In practice, it is expensive to make the thermistor thin, and very difficult to make the solder very thin so that the solder and thermistor thicknesses (for reasonably-priced devices) remain fairly constant.

There will now be discussed certain reliability features of the system.

First, the flame sensor PC (FIG. 2) which is a photo-conductor is incorporated in the circuit in a particular way so that it has a long stable life by operating at low electrical power levels. When no flame is sensed, the resistance R of the photoconductor is very high and even if it must withstand the full DC voltage developed by the bridge rectifier of flame control FC the electrical power ($P = V^2/R$) is very low because of the high value of the resistance R. When there is flame the resistance of the photoconductor is very low but the silicon controlled rectifier fires early in the alternating-current cycle and the voltage across the photoconductor is equal to the voltage drop in the silicon controlled rectifier which is extremely low. Therefore, the power dissipated in the flame sensor PC (photoconductor) is again low due to this low voltage.

Other reliability features are concerned with the fail-safe operation of the temperature limit control TLC and the flame control FC. For fail-safe operation it is required that the failure of any component in a unit under consideration either causes the feeding of fuel to stop immediately or at the beginning of the next combustion cycle.

Figure 2:
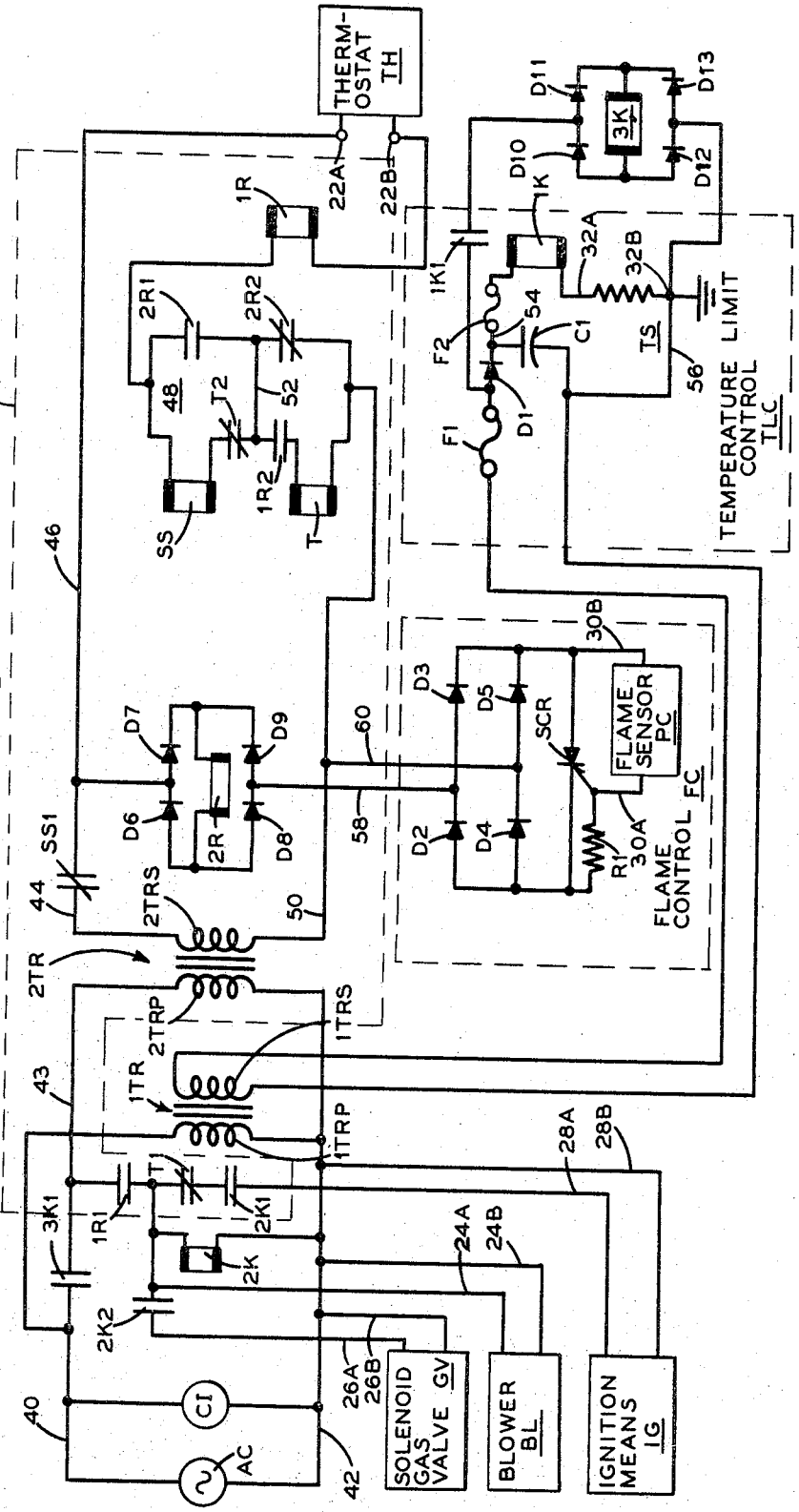
FIG. 2 is an electrical schematic diagram of the control apparatus employed in the heating system of FIG. 1.

Consider first the temperature limit control TLC (FIG. 2). If thermistor TS open-circuits, relay 1K either de-energizes or cannot be energized. Therefore, since relay 1K is a reed relay whose reed contacts are self biased to open, relay 1R deenergizes or cannot be energized. When thermistor TS short-circuits, the excess current drawn melts fusible element F2 interrupting the current through the winding of relay 1K which deenergizes. If the coil of relay 1K short- or open-circuits, relay 1K deenergizes. If capacitor C1 open-circuits, pulsating direct current is fed to the coil of relay 1K causing periodic energization of relay 1K. However, the energization is for only thirty percent (approximately) of the alternating-current cycle and not enough to cause relay 1K to energize. When capacitor C1 short-circuits, excess current is drawn causing fusible element F1 to open preventing current flow through the winding of relay 1K. If diode D1 open-circuits, no current flows through the coil of relay 1K. When diode D1 short-circuits, the excessive current vaporizes fusible element F1 and no current can flow through the winding of relay 1K. If transformer 3TR open- or short-circuits no current is available to energize relay 1K. If any one of the diodes D10, D11, D12 or D13 open- or short-circuits, relay 3K receives only half wave power; that is, for only half of the alternating current cycle, so that relay 3K does not pull in. Any overtemperature condition caused by one of the diodes D10, D11, D12 or D13 short-circuiting is prevented by fuse F1 blowing. Hence, it is seen that the failure of any component results in relay 1K or 3K being in the deenergized state and since the energization of relay 3K requires that relay 1K be in the energized state relay 3K is forced into the de-energized state when relay 1K is not energized. And, since the energization of gas valve GV occurs only when relay 3K is energized no fuel is fed as long as relay 1K is in the deenergized state.

Now consider the flame control FC. If one of the diodes D2, D3, D4 or D5 open-circuits the coil of relay 2R receives current for only half of each alternating-current cycle and therefore cannot pull in, though it can hold in permanently. If one of the diodes D2, D3, D4 or D5 short-circuits, relay 2R is continuously pulled in. When silicon controlled rectifier SCR open-circuits, relay 2R cannot be energized; and when silicon controlled rectifier SCR short-circuits, relay 2R is continuously energized. If resistor R1 open-circuits, the capacitive current coupled to the flame sensor PC from conductors carrying alternating-current is sufficient to cause silicon controlled rectifier SCR to continuously conduct and relay 2R is continuously energized. When resistor R1 is short-circuited, the gate cathode junction of the silicon controlled rectifier SCR is shorted, and it cannot be fired. When flame sensor PC is open circuited, relay 2R cannot be energized; and when flame sensor PC is short-circuited, relay 2R is continuously energized. In summary, any component failure in the flame control FC either results in the inability to energize relay 2R, or in the continuous energization of relay 2R. If relay 2R cannot be energized, then, when relay 1R is energized, at the start of a combustion cycle, alternating-current flows through the relay network 48 via the winding of relay SS, contact set T2, lead 52 and contact set 2R2 and this path never changes. Therefore, relay SS energizes opening contact set SS1 to deenergize relay 1R. If relay 2R is continuously energized, then, at the start of a combustion cycle, no path is closed through the relay network 48 to permit a current flow for the winding of relay 1R since contact set 1R2 is open (relay 1R is not yet energized) and contact set 2R2 is open (relay 2R is energized). The feeding of fuel is dependent on energization of gas valve GV which depends on contact set 1R1 being closed; and the latter only closes when relay 1R is energized. Therefore, it is seen that the failure of any component in flame control FC results in the prevention of the feeding of fuel to the burner BU.

There has thus been shown improved control apparatus for the fuel burning portion of a heating system which by employing optical flame sensing and thermistor sensing of boiler fluid temperature permits the rapid response to conditions demanding the shut down of the system. While the control apparatus is ideally suited for compact boilers it can be used effectively with other types. Furthermore, the disclosed control apparatus by virtue of the novel combination of elements employed is not only fast acting and reliable but also extremely safe because of its fail-safe features.

While only one embodiment of the various aspects and features of the invention has been shown and described in detail there will now be obvious to those skilled in the art many modifications and variations satisfying many or all of the objects of the invention, but which do not depart from the spirit thereof as defined in the appended claim.

What is claimed is:

A temperature probe for sensing the temperature in a boiler which includes a housing defining a chamber, a fluid in said chamber, and said housing being provided with a threaded opening; said probe comprising a hollow threaded metal fitting for meshing with the threads of the opening, a hollow tube of thin conductive material, one end of said hollow tube being thermally and electrically connected to said fitting, a thin metallic disc which is thermally and electrically conductive connected to the other end of said hollow tube with the peripheral edge of said disc extending radially beyond the entire circumference of said hollow tube, said disc having a given coefficient of thermal expansion, a thermistor having a coefficient of thermal expansion substantially equal to said given coefficient of thermal expansion, adhesive means for fixing said thermistor in intimate thermal contact with the face of said disc which is within the confines of said hollow tube, and electrical signal conductor means connected to said thermistor and extending through said hollow tube and said fitting for connection to a control circuit.

References Cited

UNITED STATES PATENTS

| | | | |
|---|---|---|---|
| 2,414,792 | 1/1947 | Becker | 338—22 |
| 2,526,251 | 10/1950 | Medlar | 338—30 |
| 2,753,714 | 7/1956 | Perkins et al. | 338—23 |
| 2,762,998 | 9/1956 | Talbott | 73—362 |
| 2,818,482 | 12/1957 | Bennett | 338—30 |
| 2,861,159 | 11/1958 | Seney | 338—28 |
| 2,933,708 | 4/1960 | Elliot et al. | 338—28 |
| 2,961,625 | 11/1960 | Sion | 338—28 |
| 3,044,296 | 7/1962 | Boddy | 338—28 |
| 3,076,339 | 2/1963 | Barton | 73—362 |
| 3,221,284 | 11/1965 | Summerer | 338—25 |
| 3,270,309 | 8/1966 | Vanik et al. | 338—25 |
| 3,270,310 | 8/1966 | Matson et al. | 338—22 |

RICHARD M. WOOD, *Primary Examiner.*

ANTHONY BARTIS, *Examiner.*

W. D. BROOKS, *Assistant Examiner.*